United States Patent
Watkins

[19]

[11] Patent Number: 5,865,401
[45] Date of Patent: Feb. 2, 1999

[54] TETHERED SPACE PLATFORM ASSEMBLY FOR ISOLATION ORBITING

[75] Inventor: John L. Watkins, Cupertino, Calif.

[73] Assignee: Space Systems/Loral, Inc., Palo Alto, Calif.

[21] Appl. No.: 705,217

[22] Filed: Aug. 29, 1996

[51] Int. Cl.$^6$ .............................. B64G 01/64; B64C 01/22
[52] U.S. Cl. ........................................ 244/159; 244/118.2
[58] Field of Search ................................ 244/158 R, 159, 244/118.2

[56] References Cited

U.S. PATENT DOCUMENTS

| | | | |
|---|---|---|---|
| 4,750,692 | 6/1988 | Howard | 244/161 |
| 4,824,051 | 4/1989 | Engelkind | 244/158 R |
| 4,954,952 | 9/1990 | Ubhayakar et al. | 244/161 |
| 4,964,062 | 10/1990 | Ubhayakar et al. | 244/161 |
| 4,964,596 | 10/1990 | Granssle et al. | 244/161 |
| 5,279,482 | 1/1994 | Dzenitis et al. | 244/161 |
| 5,305,970 | 4/1994 | Porter et al. | 244/161 |

FOREIGN PATENT DOCUMENTS

| | | | |
|---|---|---|---|
| 5-294300 | 11/1993 | Japan | 244/158 R |

*Primary Examiner*—V. Lissi Mojica
*Attorney, Agent, or Firm*—Perman & Green, LLP

[57] ABSTRACT

A space platform assembly designed to be attached to the outer surface of a space station structure for deployment of a tethered space platform into isolation orbit alongside the space station. The space platform is designed to carry payloads such as for research experimentation in the microgravity environment of space. The tether comprises a loose power/data umbilical for the deployed space platform while it orbits free of the vibration and g-jitter problems of the space station.

7 Claims, 2 Drawing Sheets

TETHERED SPACE PLATFORM ASSEMBLY FOR ISOLATION ORBITING

BACKGROUND OF THE INVENTION

1. Field of the Invention

The present invention relates to a space station such as for supporting untended research experimentation in a microgravity space environment.

Outer space provides a natural microgravity and high vacuum environment which is not available on earth and which is perfect for certain research experimentation dealing with physical and chemical phenomena which are retarded, blocked, or masked by the effects of gravity.

2. State of the Art

It has been proposed to conduct such experimental research in large, manned space stations but such stations cannot provide the necessary microgravity or vacuum environment within the space station as is present in space external to the space station, due to the physical tolerance limitations of the occupants of the station. Also, manned space stations are large and complex, and they incorporate a plurality of vibration sources and excessive g-jitter which interferes with research experimentation.

Free-flying, powered space disks or platforms have been constructed and employed for ultravacuum and low gravity space experimentation. In particular, the Wake Shield and the Eureca platforms are dedicated to providing these environments to payloads. The Wake Shield Facility, is a 12-foot diameter stainless steel disk which is deployed from the cargo bay of a space shuttle and is powered and maneuvered to a location 30 or 40 miles from the shuttle and oriented to shield out the residual atmosphere that remains in low earth orbit, thereby creating an ultra-pure vacuum in its wake. This ultra-vacuum is used as an environment in which to conduct epitaxy in which exceptionally pure and atomically-ordered thin films of semiconductor compounds such as crystalline gallium arsenide can be grown in the ultra-vacuum environment which is free of contaminants.

The Eureca Free Flyer is a reusable free flying platform which, like the Wake Shield, is deployed to and retrieved from space via the space shuttle. Eureca is being made available for microgravity payloads which require a very low gravity environment and/or high vacuum. Once deployed from the shuttle bay, it is placed in an orbit in which it remains for up to a year.

Free-flying platforms such as Wake Shield and Eureca are expensive, complex and incorporate the disadvantages of vibration and g-jitter since they require power and avionics necessary to accomplish free flight and maneuverability to some distance from the orbiter, and back to the orbiter for retrieval into the cargo bay of the space shuttle for return to Earth. In addition, launch and retrieval by the Space Shuttle is very expensive and severely limits the availability of flights.

The present invention is concerned with providing a relatively inexpensive and practical solution to the problems of vibration, g-jitter and space limitations while providing an easily accessible facility for microgravity space experimentation.

SUMMARY OF THE INVENTION

The present invention comprises a novel assembly of a support base designed to be secured to an external surface of a space station structure, and a payload-supporting platform which is releasably-attached to the support base and is loosely-tethered to the support base by means of a power/data cable or umbilical which enables the platform to be released from rigid attachment to the space station and to orbit alongside the space station to provide a large platform for conducting and controlling desired research experiments in the microgravity atmosphere of space, isolated from the vibration, g-jitter and space limitations encountered when such experiments are conducted within the confines of the space station.

THE DRAWINGS

FIG. 1 is a schematic illustration of a support base/payload-supporting platform assembly attached to a space station structure, showing the platform latched or otherwise secured to the support base, and FIG. 2 corresponds to FIG. 1 but shows the payload-supporting platform deployed from the support base for independent orbit, alongside the space station structure, while being loosely tethered to the support base by a power/data cable.

DETAILED DESCRIPTION

Figure 1:
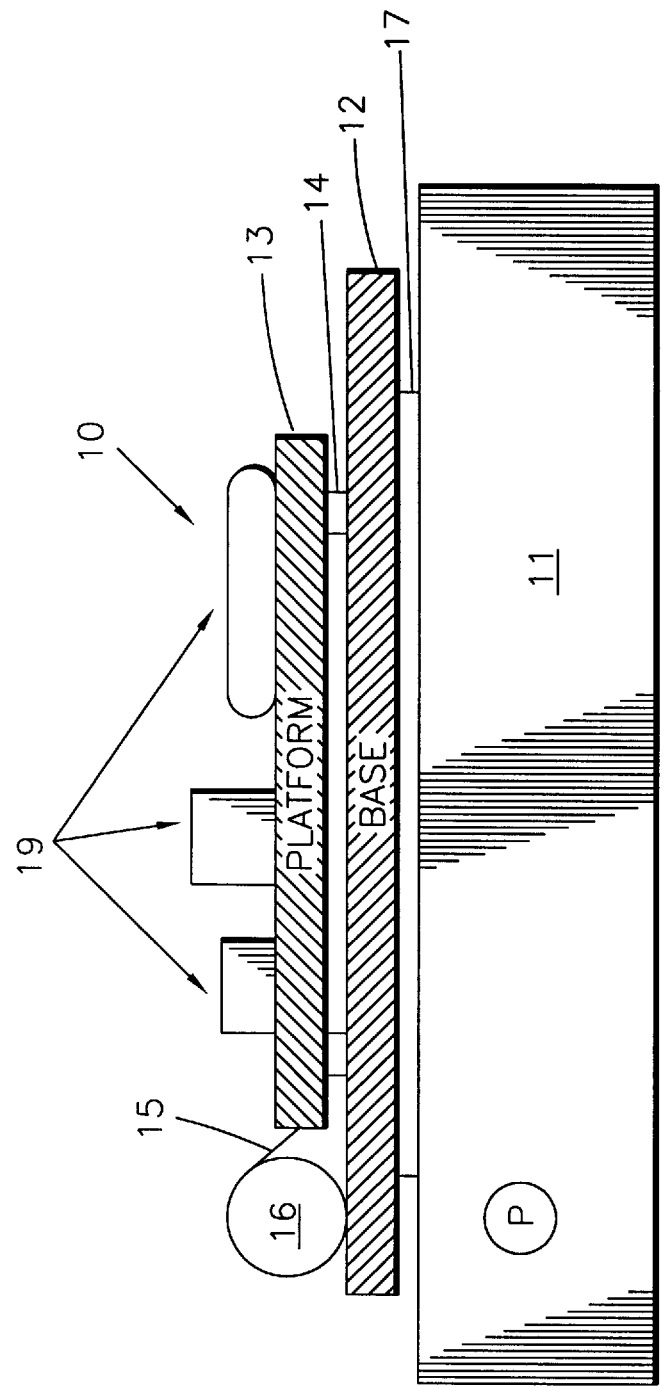

Referring to the drawings, the present assembly 10 is illustrated in coupled position in FIG. 1, secured to an outer surface of a space station structure 11. The assembly 10 comprises a support base 12, a payload-supporting platform 13, latching means 14 releasably-attaching the platform 13 to the base 12, and a power/data cable 15 and dispenser or spool 16 containing power and command data lines communicating between electrical power supply means P on the the space station 11 and the platform 13 to provide for remote unlatching, deployment and attitude control of the platform, retrieval docking, and re-latching of the platform, power for initiating and controlling experimentation, command data supply and information receipt.

The assembly support base 12 is secured to the outer surface of the space station structure 11 by am attachment means 17, such as bolt means.

The cable dispenser 16 or spool preferably comprises a remotely-controlled electrically powered spool means for expending and retracting the cable 15 to deploy and recapture the platform 13, in cooperation with remote activation of the latch means 14 between open position, for release of the platform 13, and closed position, for recapture.

The cable 15 may contain a strain relief loop 18 or vibration control transducers (smart cable) to increase the isolation of the deployed platform against any vibration or g-jitters of the space station structure 11.

Figure 2:
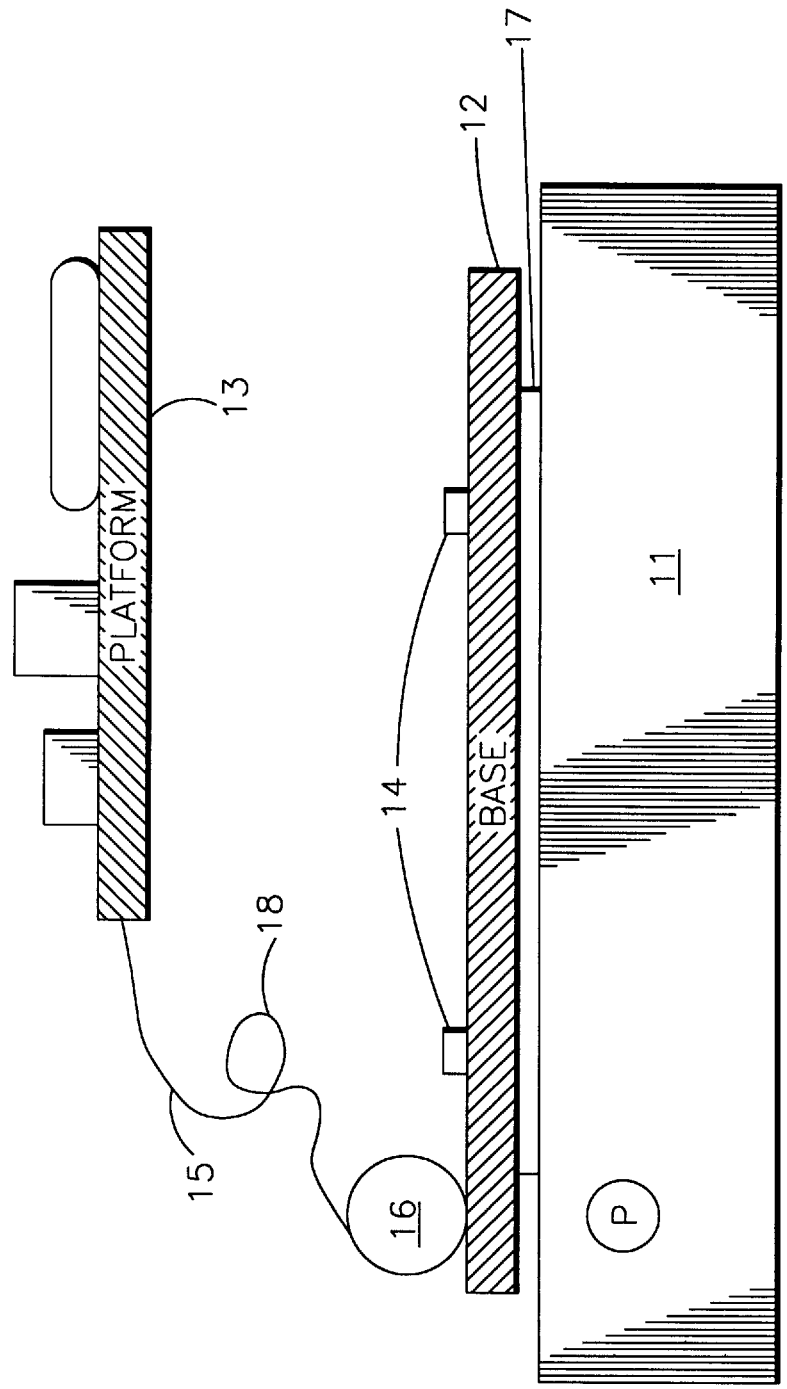

FIG. 2 illustrates the platform 13 released from and deployed in orbit spaced from the support base 12 and the space system structure 11.

The platform 13 has fixed thereto a plurality of payloads 19 such as electrical power control means, thrusters, reactors, chemical supply stations, heaters, pumps and/or other integrated elements necessary to conduct the desired experimentation in the microgravity environment of space.

The platform 13 preferably has its own attitude control system consisting of electric thrusters which are remotely-controlled from within the space station, via cable 15, to deploy the platform 13 and control its attitude at the desired isolation distance from the space station structure 11, using a very low continuous thrust which can counteract the air drag, tidal-and solar wind-induced acceleration to maintain stationary attitude and orbit relative to the space station. The electric thrusters on the platform 13 are also used for maneuvering and retrieval of the platform 13, in cooperation with the tether cable 15. Payloads 19 can be refreshed or exchanged while the platform 13 is reattached to the base 12 or is secured to the space station by robotic arms, and then the platform can be re-deployed for another period of isolated orbit.

It will be apparent to those skilled in the art that the present orbiting platform 12 can be utilized for a wide variety of purposes in addition to microgravity experimentation, such as astronaut support systems and supplies, audio and visual space exploration equipment and scientific experimentation which require or benefit from the properties of a space environment in addition to microgravity, such as ultra-vacuum conditions.

While preferred embodiments of the invention have been disclosed if detail, it should be understood by those skilled in the art that various other modifications may be made to the illustrated embodiments without departing from the scope if the invention as described in the specifications and defined in the appended claims.

What is claimed is:

1. A space assembly comprising a space station structure, a support base attached to said space station structure, and a space platform which is releasably-attached to said support base for deployment into space and is tethered thereto for recovery from space by a power/data cable which extends loosely between said support base and said space platform when the space platform is released from the support base, to supply electrical power and data interchange from the space station structure, through the cable, to the space platform, whereby the space platform can be released into orbit alongside the space station structure and electrically-controlled therefrom through said loose power data cable for controlling research experiments on the space platform while it is isolated from any vibration of said space station structure.

2. A space assembly according to claim 1 in which said assembly comprises an electrically powered spool means for supplying and retracting said power/data cable by remote control means.

3. A space assembly according to claim 2 in which said spool means is attached to said support base.

4. A space assembly according to claim 1 in which said power data cable comprises means for maintaining the cable loosely tethered between the space platform and the support base and isolated from the vibration of the space station structure.

5. A space assembly according to claim 1 in which said means comprises a strain relief loop in the power/data cable.

6. A space assembly according to claim 1 in which said space platform supports a plurality of payloads which are integrated, powered, and controlled to conduct research experimentation in the microgravity environment of space while isolated against the vibration and g-jitter conditions present within a manned space station.

7. A space assembly according to claim 1 in which said space platform includes electrically-powered thruster means for the deployment, maneuvering and return of the space platform to the support base.

* * * * *